(12) United States Patent
Martin, Jr.

(10) Patent No.: US 6,421,686 B1
(45) Date of Patent: Jul. 16, 2002

(54) METHOD OF REPLICATING DATA RECORDS

(75) Inventor: James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,486

(22) Filed: Nov. 15, 1999

(51) Int. Cl.[7] .............................................. G06F 17/30
(52) U.S. Cl. ....................................... 707/201; 707/204
(58) Field of Search ................................ 707/201, 204, 707/10, 6, 226

(56) References Cited

U.S. PATENT DOCUMENTS

| | | | | |
|---|---|---|---|---|
| 5,448,727 A | * | 9/1995 | Annevelink | 395/600 |
| 5,581,753 A | | 12/1996 | Terry et al. | 395/617 |
| 5,586,310 A | * | 12/1996 | Sharman | 395/600 |
| 5,765,171 A | | 6/1998 | Gehani et al. | 707/203 |
| 5,781,910 A | | 7/1998 | Gostanian et al. | 707/201 |
| 5,781,912 A | * | 7/1998 | Demers et al. | 707/202 |
| 5,787,441 A | * | 7/1998 | Beckhardt | 707/201 |
| 5,802,062 A | | 9/1998 | Gehani et al. | 370/465 |
| 5,819,272 A | * | 10/1998 | Benson | 707/8 |
| 5,832,225 A | * | 11/1998 | Hacherl et al. | 395/200.53 |
| 5,832,487 A | | 11/1998 | Olds et al. | 707/10 |
| 5,870,761 A | * | 2/1999 | Demers et al. | 707/201 |
| 5,884,324 A | | 3/1999 | Cheng et al. | 707/201 |
| 5,937,415 A | * | 8/1999 | Sheffield et al. | 707/204 |
| 6,167,427 A | * | 12/2000 | Rabinovich et al. | 709/201 |

* cited by examiner

Primary Examiner—John Breene
Assistant Examiner—Leslie Wong
(74) Attorney, Agent, or Firm—John R. Pivnichny

(57) ABSTRACT

Data records in a source database on a server are replicated to a cross-domain second server. A devoted client is formed having access to both servers. A generic agent manager database is created having one field, one form, one document, and one view. An intermediary agent is created in the generic agent manager database and run against the source database to replicate records to the second server.

12 Claims, 4 Drawing Sheets

METHOD OF REPLICATING DATA RECORDS

TECHNICAL FIELD

The invention relates generally to methods of replicating data stored in a database on a server computer and in particular to replicating the data to a cross-domain second server.

BACKGROUND OF THE INVENTION

Businesses commonly use databases to store large amounts of data for easy access and manipulation by various people within the business entity. In some cases people outside the business may also be given access to one or more databases. While maintaining a single centralized database has the advantage of avoiding inconsistencies which might occur with multiple copies, there is often a need to replicate the data stored in a database on one server computer to a second server computer. Where only one copy of the database exists, the system may appear slow when multiple users attempt to process such cross-server transactions. If the server having the single copy becomes unavailable, then the entire system may become unavailable. Today's business organizations, especially those with multiple locations often have server computers located at the various locations interconnected via a communicating network.

A user with access to one server may need to perform a transaction involving data in a database located on another server. Whether the second server is located at a remote location or at the same location as the first server, access controls commonly used in business for security purposes may either allow or prevent such a transaction from occurring.

For these reasons and others, there is often a need to replicate a database from one server to another. That is a copy of each data item stored in a database on one server may also reside on a second server. By replicating the data across multiple servers, a level of fault tolerance is achieved. In addition, the response time for transactions run on a local copy of the database is usually much faster.

Various strategies have been developed for maintaining the multiple copies of data to insure that transactions run on one copy are accurately reflected in other copies throughout the system. Cheng et al. in U.S. Pat. No. 5,884,324 use a database table and data replication period to reconstruct changes made to a database and transmit the changes to a remote server. Gostanian et al. in U.S. Pat. No. 5,781,910 describe using coordination protocols which govern the execution of the transactions to assure consistent data replication across the system. Gehani et al, in U.S. Pat. No. 5,765,171 use a database version vector to keep track of the updates to data items in the copies. During replication the version vectors are compared to determine if replication is necessary. In U.S. Pat. No. 5,802,062, Gehani et al. use a token passing system to prevent conflicts and eliminate a need for coordination of execution. Olds et al. in U.S. Pat. No. 5,832,487 describe a method of identifying replicas with tuned-name identifiers which provides improved synchronization over other existing methods. Hacherl et al. in U.S. Pat. No. 5,832,225 uses a knowledge consistency checker to enforce replication as efficiently as possible so that each change is transmitted only once in a single direction over interserver links which are expensive.

All of these strategies for maintaining copies require some method of replicating some or all of the data in a database on one server to another server.

Unfortunately, some security methods such as provided by the LOTUS NOTES® product (LOTUS NOTES is a registered trademark of Lotus Development Corp of Cambridge, Mass.) require that two servers reside in the same domain for normal replication of a database to proceed. For cross-domain replication to occur, a cross-certificate must be issued by a source server to a destination server. Most organizations do not permit their server to issue cross-certificates to other servers because of the potential for compromised security, or for other business reasons. A system administrator who maintains a server is therefore prevented from using the benefits of replication of a database as described above. In accordance with the teachings of the present invention, there is defined an improved and unique method for performing such a replication.

It is believed that such a method would constitute a significant advancement in the art whether used with one of the above strategies or not.

OBJECTS AND SUMMARY OF THE INVENTION

It is therefore a principal object of the present invention to provide a method of replicating data stored in a database on a first server to a second database on a second server.

It is a another object to provide such a method wherein the second server resides in a different domain from the first server.

It is a further object to provide such a method which is implemented in a relatively inexpensive and rapidly running manner.

These and other objects are attained in accordance with one embodiment of the invention wherein there is provided a method of replicating records in a source database on a first server to a second database on a cross-domain second server, comprising the steps of, forming a devoted client having access to the first and second servers, creating a generic agent manager database on the devoted client having one field, one form, one document, and one view, creating an intermediary agent in the generic agent manager database, and running the intermediary agent against the source database on the first server to replicate the records to the second database on the second server.

BEST MODE FOR CARRYING OUT THE INVENTION

For a better understanding of the present invention, together with other and further objects, advantages, and capabilities thereof, reference is made to the following disclosure and the appended claims in connection with the above described drawing.

For the purposes of this specification a database is understood to mean a single file that is a collection of views, forms and documents or records. A form is a visual set of fields for entering data that will be saved as a document or record. A field on a form is a place to enter a data element. A view is a visual list of documents or records.

Figure 1:
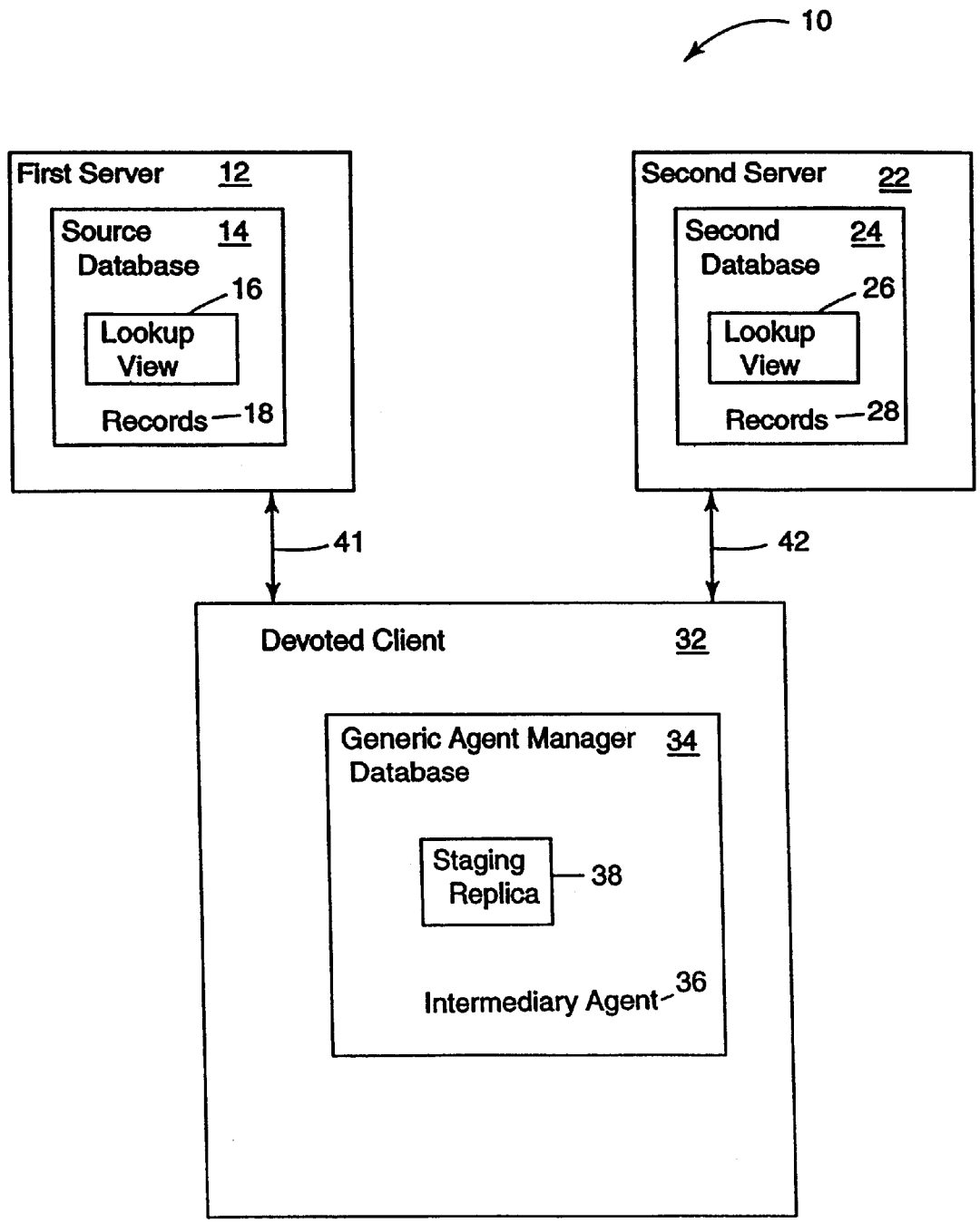
FIG. 1 is a block diagram of a computer system for replicating records in accordance with the invention.

In the FIG. 1 there is shown a computer system 10 for replicating records 18. The records 18 are in a source database 14 which resides on first server 12. First server 12 may be any computing device running any operating system and having information stored that is accessible from another computing device. By way of illustration and not limitation, some examples of server 12 are an IBM SYSTEM 390™ computer running OS/390™ (SYSTEM 390 and OS/390 are trademarks of International Business Machines Corporation of Armonk, N.Y.), any Intel based computing device running OS/2™ (OS/2 is a trademark of International Business Machines Corporation) WINDOWS™, or WINDOWS NT™ (WINDOWS and WINDOWS NT are trademarks of Microsoft Corporation of Redmond, Wash.), a RISC or RS/6000™ machine, an AS400™ running OS/400™ or Unix (RS/6000, AS400, and OS/400 are trademarks of International Business Machines Corporation).

Figure 2:
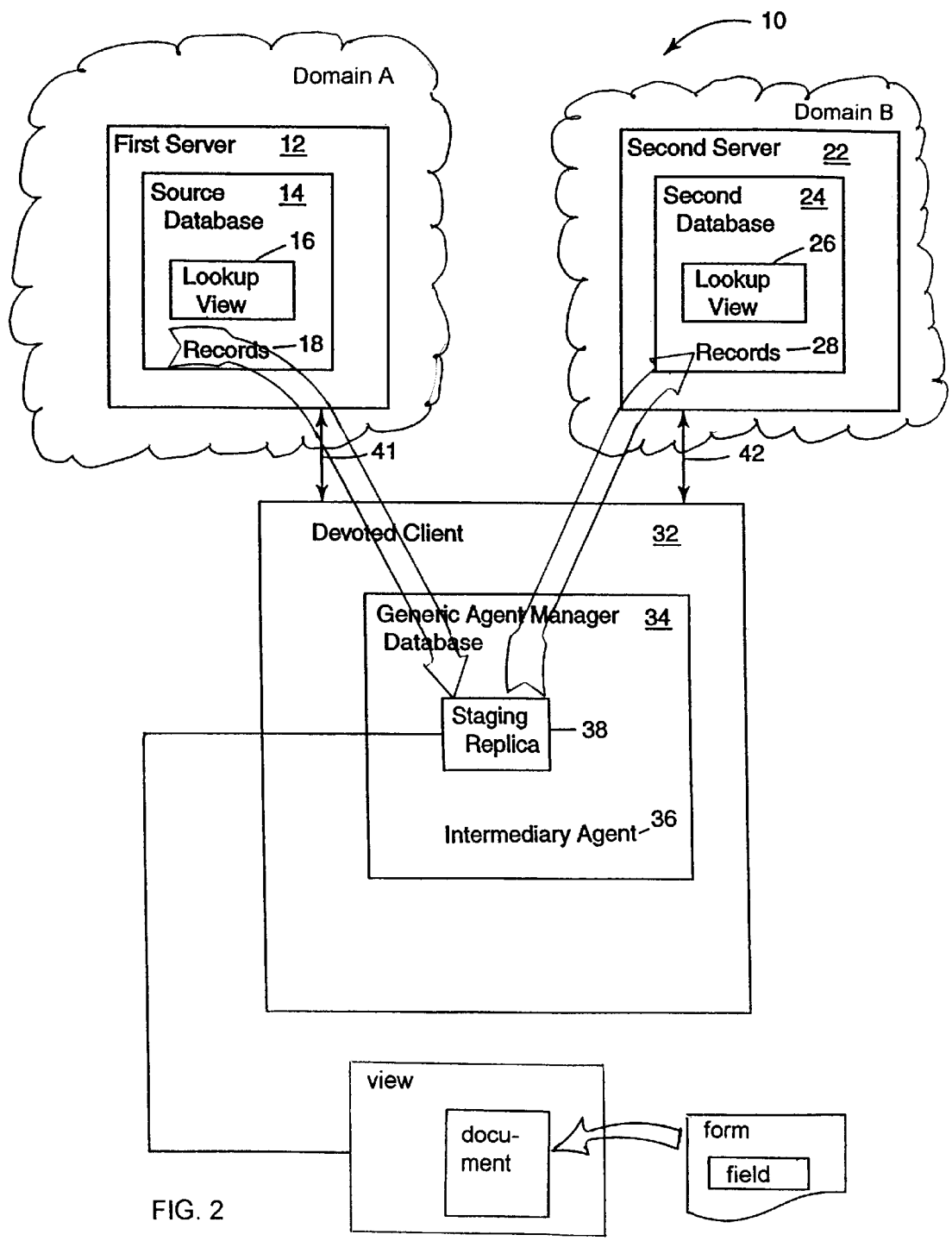
FIG. 2 shows additional detail of several elements in the block diagram of FIG. 1.

A second server 22 may be located at the same site as first server 12 or it may be situated remotely at any site anywhere in the world. As shown in FIG. 2, second server 22 is not configured to be in the same domain as server 12. A domain is understood to mean a plurality of servers connected on a single network such as a token ring, ethernet or other local or wide area network. In general it is desired to replicate records 18 in source database 14 on first server 12 to a second database 24 residing on second server 22. After replication, records 28 in second database 24 residing on second server 22 would be a copy of records 18. Lookup views 16, 26 may be in source database 14 and second database 24 respectively. Lookup view 16 includes a list of documents each having a unique identifier such as one or a combination of fields. For data security reasons as noted above or any other reason, second server 22 does not have cross-domain access to first server 12 and vice versa.

Intermediary agent 36 in generic agent manager database 34 resides on devoted client 32 which has access to first server 12 via connection 41 and access to second server 22 via connection 42. Connections 41 and 42 may be a network connection such as token ring, ethernet, or a telephone line, or a TI line, SONET or ISDN or other type of connection. Devoted client 32 may be any computing device such as those examples listed above for a server but having access to information stored on another computing device e.g. a server. Devoted client 32 may also be a Lotus Notes client. Intermediary agent 36 may be a stand alone program not part of either a source or destination database which performs data processing on data located in both the source and destination databases. Intermediary agent 36 may also be a LOTUS NOTES agent for performing replication activity. Staging replica comprising all documents to be replicated between first server 12 and second server 22 may also be located in generic agent manager database 34. Generic agent manager database 34 in a preferred embodiment has at least one view, one field, one form and even more preferable only one document in order to guarantee a single execution of the intermediary agent.

Figure 4:
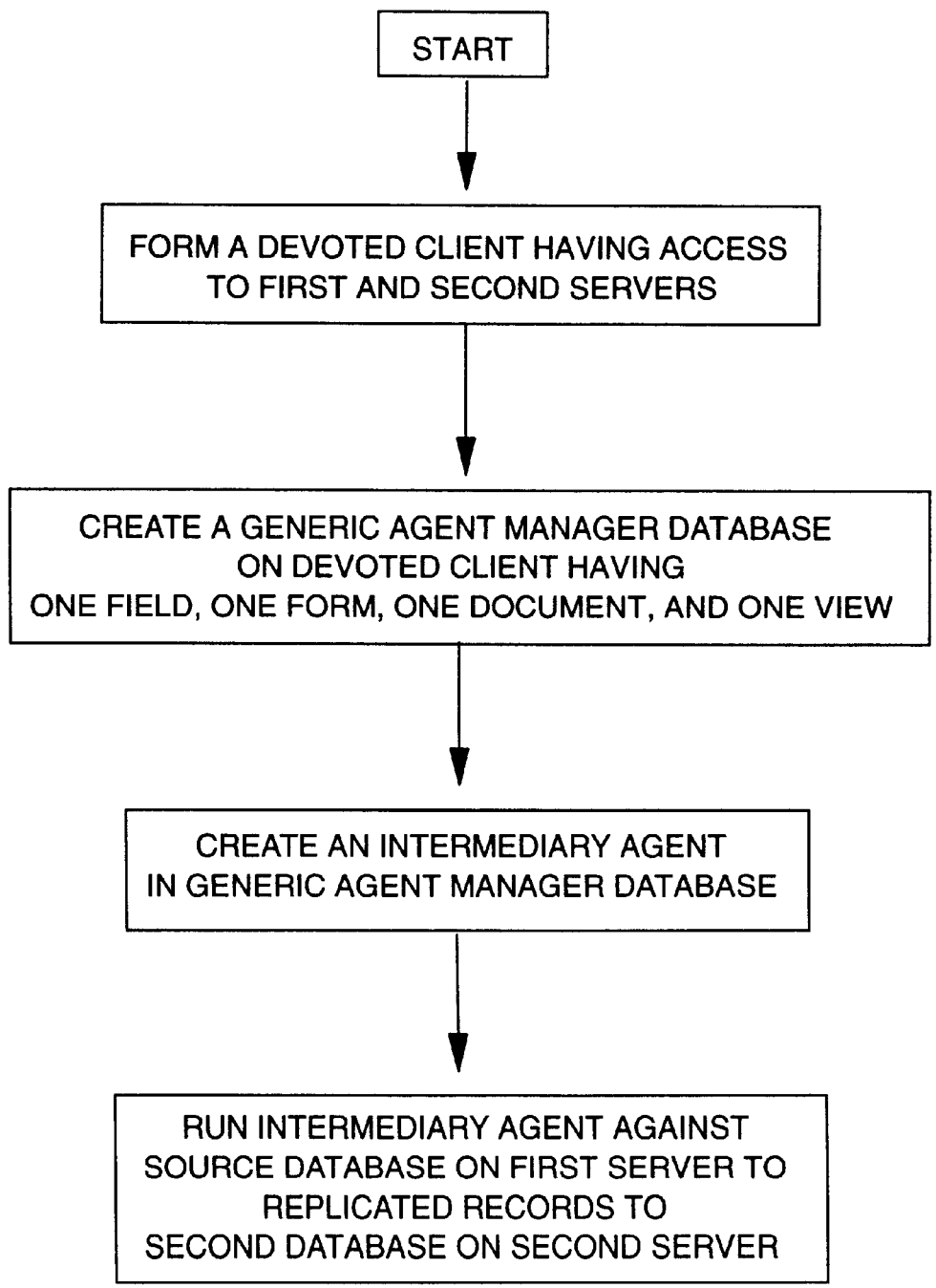
FIG. 4 is a flowchart depicting steps in accordance with an emboiment of the present invention.

In operation the devoted client having access to first 12 and second 22 servers is formed as shown in FIG. 4. Generic agent manager database 34 is created having one field, one form, one view, and one document as shown in FIG. 2. Intermediary agent 36 is created and run against source database 14 on first server 12 to replicate records 18 to second database 24 where they appear as records 28.

In one embodiment, intermediary agent 36 operates by replicating records 18 to staging replica 38 which may be temporary storage for holding a temporary copy and then replicating staging replica 38 to second database 24. In another embodiment intermediary agent 36 when run may also perform data processing operations with records 18 in addition to the replication operations just described. Examples of such data processing operations are deleting, creating, or modifying documents, or examining document contents to perform additional data processing operations in other databases. Data processing operations would otherwise have to be performed by data processing personnel who manually enter a series of commands or manually enter commands to directly edit the data.

Figure 3:
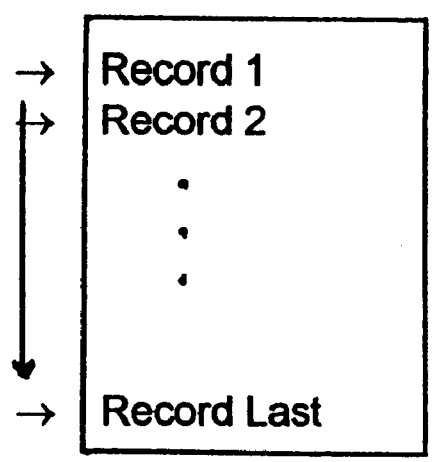
FIG. 3 shows the step of traversing a lookup view.

In yet another embodiment of the invention, lookup view 16 is formed and intermediary agent 36 as shown in FIG. 3 traverses lookup view 16 in source database 14 and replicates records 18 by modifying fields based on which fields it is desired to replicate in second database 24.

While there have been shown and described what are at present considered to be the preferred embodiments of the invention, it will be obvious to those skilled in the art that various changes and modifications may be made therein without departing from the scope of the invention as defined in the appended claims.

What is claimed is:

1. A method of replicating records in a source database on a first server to a second database on a cross-domain second server, comprising the steps of:

forming a devoted client having access to said first and second servers;

creating a generic agent manager database on said devoted client having one field, one form, one document, and one view;

creating an intermediary agent in said generic agent manager database; and running said intermediary agent against said source database on said first server to replicate said records to said second database on said second server.

2. The method as set forth in claim 1, wherein said intermediary agent replicates said records to said second database on said second server by first replicating to a staging replica and then replicates said staging replica to said second database on said second server.

3. The method as set forth in claim 1, wherein said intermediary agent when run performs data processing with said records in said source database and said second database.

4. The method as set forth in claim 1, further comprising forming a lookup view in said source database and said second database and wherein said intermediary agent replicates said records by traversing said lookup view in said source database to modify fields in said second database.

5. A computer system for replicating records in a source database on a first server to a second database on a cross-domain second server, said system comprising:

means for forming a devoted client having access to said first and second servers;

means for creating a generic agent manager database on said devoted client having one field, one form, one document, and one view;

means for creating an intermediary agent in said generic agent manager database; and means for running said intermediary agent against said source database on said first server to replicate said records to said second database on said second server.

6. The computer system of claim 5, wherein said intermediary agent includes means for replicating said records to said second database on said second server by first replicating to a staging replica and then replicates said staging replica to said second database on said second server.

7. The computer system of claim 5, wherein said intermediary agent includes means for performing data processing with said records in said source database and said second database.

8. The computer system of claim 5, further comprising means for forming a lookup view in said source database and said second database and wherein said intermediary agent replicates said records by traversing said lookup view in said source database to modify fields in said second database.

9. A computer program product for instructing a processor to replicate records in a source database on a first server to a second server, said computer program product comprising:

a computer readable medium;

first program instruction means for forming a devoted client having access to said first and second servers;

second program instruction means for creating a generic agent manager database on said devoted client having one field, one form, one document, and one view;

third program instruction means for creating an intermediary agent in said generic agent manager database; and fourth program instruction means for running said intermediary agent against said source database on said first server to replicate said records to said second database on said second server; and wherein all four said instruction means are recorded on said medium.

10. The computer program product of claim 9, wherein said intermediary agent includes program instruction means for replicating said records to said second database on said second server by first replicating to a staging replica and then replicates said staging replica to said second database on said second server.

11. The computer program product of claim 9, wherein said intermediary agent includes program instruction means which when run performs data processing with said records in said source database and said second database.

12. The computer program product of claim 9, further comprising fifth program instruction means recorded on said medium for forming a lookup view in said source database and said second database and wherein said means for running said intermediary agent includes means for replicating said records by traversing said lookup view in said source database to modify fields in said second database.

* * * * *